United States Patent
Taru et al.

(10) Patent No.: US 8,503,846 B2
(45) Date of Patent: Aug. 6, 2013

(54) ALL SOLID PHOTONIC BANDGAP FIBER

(75) Inventors: Toshiki Taru, Yokohama (JP); Jonathan Knight, Bath (GB); Tim Birks, Bath (GB); David Bird, Bath (GB)

(73) Assignee: Sumitomo Electric Industries, Ltd., Osaka (JP)

( * ) Notice: Subject to any disclaimer, the term of this patent is extended or adjusted under 35 U.S.C. 154(b) by 236 days.

(21) Appl. No.: 12/920,037

(22) PCT Filed: Feb. 23, 2009

(86) PCT No.: PCT/JP2009/053788
§ 371 (c)(1),
(2), (4) Date: Feb. 18, 2011

(87) PCT Pub. No.: WO2009/107824
PCT Pub. Date: Sep. 3, 2009

(65) Prior Publication Data
US 2011/0141757 A1  Jun. 16, 2011

(30) Foreign Application Priority Data
Feb. 29, 2008  (GB) .................................. 0803864.8

(51) Int. Cl.
*G02B 6/032* (2006.01)
(52) U.S. Cl.
USPC .......................................................... 385/125
(58) Field of Classification Search
USPC .......................................................... 385/125
See application file for complete search history.

(56) References Cited

U.S. PATENT DOCUMENTS

| 3,504,060 A | 3/1970 | Gardner |
| 3,622,292 A | 11/1971 | Fleck |
| 4,629,485 A | 12/1986 | Berkey |
| 5,121,452 A | 6/1992 | Stowe et al. |
| 5,175,782 A | 12/1992 | Bowen et al. |
| 5,295,210 A | 3/1994 | Nolan et al. |
| 5,553,179 A | 9/1996 | Cryan et al. |
| 5,742,722 A * | 4/1998 | Imoto ............................ 385/126 |
| 6,173,588 B1 | 1/2001 | Berkey et al. |

(Continued)

FOREIGN PATENT DOCUMENTS

| EP | 1 571 470 A1 | 9/2005 |
| GB | 2 394 712 A | 5/2004 |

(Continued)

OTHER PUBLICATIONS

U.S. Appl. No. 12/394,433, filed Feb. 27, 2009.

(Continued)

*Primary Examiner* — Charlie Peng
(74) *Attorney, Agent, or Firm* — McDermott Will & Emery LLP

(57) ABSTRACT

All solid photonic bandgap optical fiber comprising a core region and a cladding region is disclosed. The cladding region surrounding the core region includes a background optical material having a first refractive index and elements arranged in a two-dimensional periodic structure. In one embodiment, each of the elements comprises a center part and peripheral part having a higher refractive than the central part. In other embodiments, each element comprises a plurality of rods having a higher refractive index higher than the fist, the rods of each element arranged in a circle or polygon. Light transmission apparatus and methods of using the fiber are also disclosed.

13 Claims, 14 Drawing Sheets

U.S. PATENT DOCUMENTS

| | | | |
|---|---|---|---|
| 6,243,522 B1* | 6/2001 | Allan et al. | 385/123 |
| 6,334,017 B1* | 12/2001 | West | 385/123 |
| 6,418,258 B1* | 7/2002 | Wang | 385/125 |
| 6,728,439 B2 | 4/2004 | Weisberg et al. | |
| 6,845,204 B1* | 1/2005 | Broeng et al. | 385/123 |
| 6,917,741 B2 | 7/2005 | Fekety et al. | |
| 7,072,553 B2 | 7/2006 | Johnson et al. | |
| 7,142,756 B2 | 11/2006 | Anderson et al. | |
| 7,184,641 B2* | 2/2007 | Karalis et al. | 385/129 |
| 7,221,840 B2 | 5/2007 | Vienne et al. | |
| 7,403,689 B2* | 7/2008 | Koch et al. | 385/125 |
| 7,643,715 B2 | 1/2010 | Taru et al. | |
| 8,009,951 B2* | 8/2011 | Han | 385/123 |
| 2002/0164137 A1 | 11/2002 | Johnson et al. | |
| 2003/0031407 A1 | 2/2003 | Weisberg et al. | |
| 2004/0151450 A1 | 8/2004 | Wadsworth et al. | |
| 2004/0175084 A1 | 9/2004 | Broeng et al. | |
| 2005/0041944 A1 | 2/2005 | Cryan et al. | |
| 2005/0152417 A1* | 7/2005 | Lin | 372/43 |
| 2005/0276556 A1* | 12/2005 | Williams et al. | 385/123 |
| 2006/0083472 A1* | 4/2006 | Sakai et al. | 385/129 |
| 2007/0163301 A1 | 7/2007 | Dong et al. | |
| 2009/0218706 A1 | 9/2009 | Taru | |
| 2009/0220202 A1 | 9/2009 | Taru | |

FOREIGN PATENT DOCUMENTS

| | | |
|---|---|---|
| JP | 2007-316526 | 12/2007 |
| WO | WO 00/37974 | 6/2000 |
| WO | WO 01/31376 A1 | 5/2001 |
| WO | WO 02/26648 A1 | 4/2002 |
| WO | WO 02/072489 A2 | 9/2002 |
| WO | WO 03/079077 A1 | 9/2003 |
| WO | WO 2006/014601 A2 | 2/2006 |

OTHER PUBLICATIONS

U.S. Appl. No. 12/393,432, filed Feb. 26, 2009.
J. Broeng et al., "Waveguidance by the photonic bandgap effect in optical fibres," J. Opt. A, Pure Appl. Opt. 1, pp. 477-482, 1999.
T.A. Birks et al., "Bend loss in all-solid bandgap fibres," Optics Express, vol. 14, No. 12, pp. 5688-5698, 2006.
Y. Li et al., "Effective index method for all-solid photonic bandgap fibres," J. Opt. A, Pure Appl. Opt. 9, pp. 858-861, 2007.
Z. Wang et al., "Coupling in dual-core photonic bandgap fibers: theory and experiment," Optics Express, vol. 15, No. 8, pp. 4795-4803, 2007.
M.Y. Chen, "All-solid silica-based photonic crystal fibers," Optics Communications, vol. 266, pp. 151-158, 2006.
T. Taru et al., "Raman gain suppression in all-solid photonic bandgap fiber," Proceedings of the 33rd ECOC, pp. 129-130, 2007.
T.A. Birks et al., "Scaling laws and vector effects in bandgap-guiding fibres," Optics Express, vol. 12, No. 1, pp. 69-74, 2004.
G.J. Pearce et al., "Adaptive curvilinear coordinates in a plan-wave solution of Maxwell's equations in photonic crystals," Physical Review B 71, pp. 195108, 2005.
J. M. Stone et al., "An improved photonic bandgap fiber based on an array of rings," Optics Express, vol. 14, No. 13, pp. 6291-6296, 2006.
F.X. Xian et al., "Extruded single-mode high-index one-dimensional microstructured optical fiber with high index-contrast for highly nonlinear optical devices," Applied Physics Letters, vol. 87, No. 8, pp. 81110-81112, 2005.
United States Office Action, issued in U.S. Appl. No. 12/394,433, dated Oct. 6, 2011.
Litchinitser, N., et al., "Resonances in microstructured optical waveguides", Optics Express, May 19, 2003, pp. 1243-1251, vol. 11 No. 10.
P. St. J. Russell, "Photonic-Crystal Fibers," Journal of Lightwave Technology, vol. 24, No. 12, Dec. 2006.
UK Intellectual Property Search Report issued in Application No. GB0803863.0 dated Jun. 25, 2008.
X. Feng et al., "Extruded single-mode high-index-core one-dimensional microstructured optical fiber with high-contrast for highly nonlinear optical devices," Applied Physics Letters 87, 081110 (2005).
UK Intellectual Property Search Report issued in Application No. GB0803865.5 dated Jun. 26, 2008.
Shepard, J.D., et al., "High energy nanosecond laser pulses delivered single-mode through hollow-core PBG fibers", Optics Express, Feb. 23, 2004, pp. 717-723, vol. 12 No. 4, OSA.
Zenteno, L.A., et al., "Suppression of Raman gain in single-traniverse-mode dual-hole-assisted fiber", Optics Express, Oct. 31, 2005, pp. 8921-8926, vol. 13 No. 22, OSA.
Fini, J.M., et al., "Distributed suppression of stimulated Raman scattering in an Yb-doped filter-fiber amplifier", Optics Letters, Sep. 1, 2006, pp. 2550-2552, vol. 31 No. 17, Optical Society of America.
Kim, J., et al., "Suppression of stimulated Raman scattering in high power Yb-doped fiber amplifier using a W-type core with fundamental mode cut-off", Optics Express, Jun. 12, 2006, pp. 5103-5113, vol. 14 No. 12, OSA.
British Search Report issued in British Patent Application No. GB 0806438.8, dated Jun. 30, 2008.
Taru, Toshiki et al., "Raman Gain Suppression in All-solid Photonic Bandgap Fiber," IEICE Tech Rep, vol. 107, No. 271, OFT2007-37, pp. 29-32, Oct. 2007.
Ren, Guobin et al., "Silica-based Low Loss All-solid Bandgap Fiber," Proc. of COIN-ACOFT 2007, pp. 1-3, Jun. 2007.
Ren, Guobin et al., "Low-loss all-solid photonic bandgap fiber," Optics Letters, vol. 32, pp. 1023-1025, Apr. 2007.
United States Office Action issued in U.S. Appl. No. 12/394,433 dated May 16, 2011.
United States Office Action issued in U.S. Appl. No. 12/393,432, mailed Jan. 25, 2011.
Great Britain Search Report issue din Great Britain Application No. GB 1121715.5 dated Jan. 18, 2012.
United Kingdom Examination Report, cited in United Kingdom Patent Application No. GB0803864.8, dated Aug. 19, 2011.
United Kingdom Examination Report issued in United Kingdom Patent Application No. GB1121715.5 dated Jul. 12, 2012.
United Kingdom Intellectual Property Search Report issued in application No. GB0803864.8 dated Jun. 27, 2008.

* cited by examiner

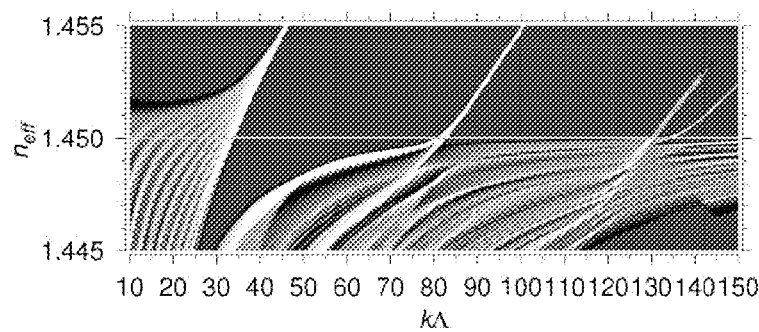
Fig. 3a (d/Λ=0.2)
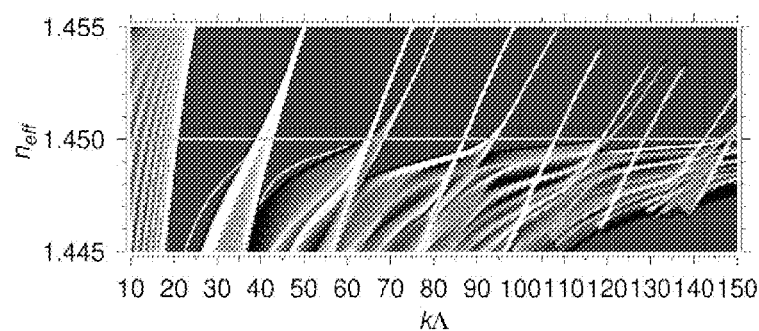
Fig. 3b (d/Λ=0.4)
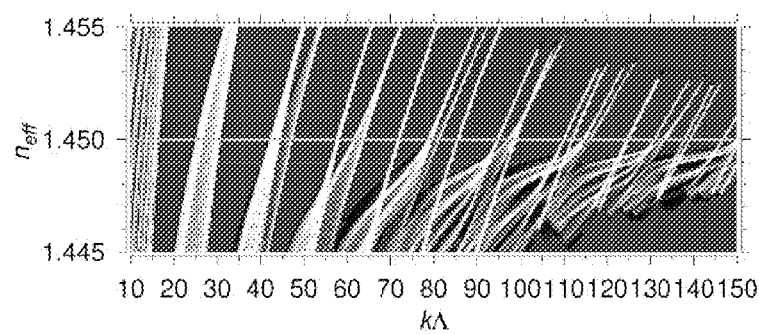
Fig. 3c (d/Λ=0.6)
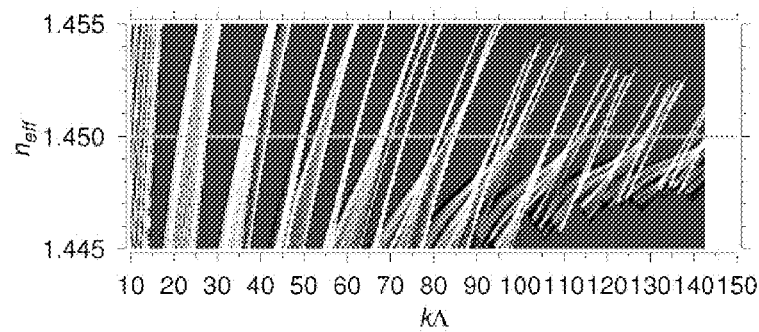
Fig. 3d (d/Λ=0.7)

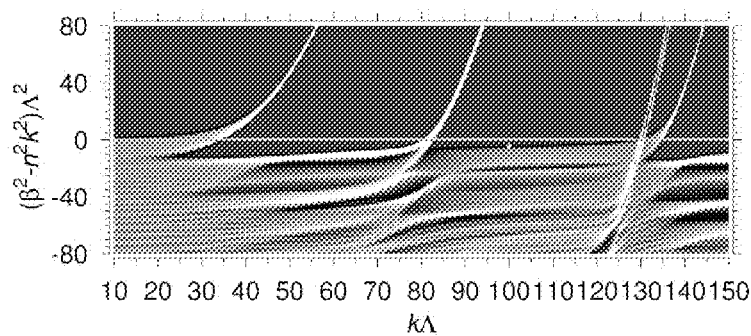
Fig. 4a (d/Λ=0.2)
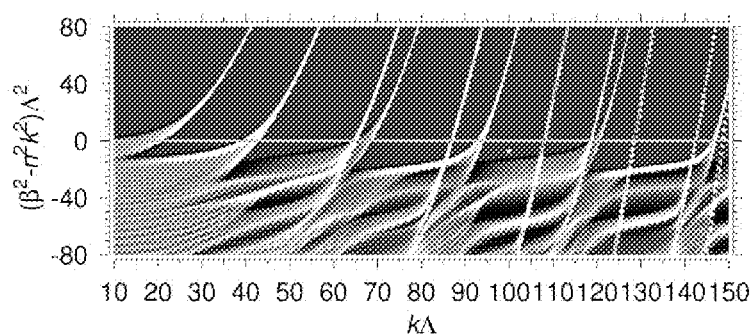
Fig. 4b (d/Λ=0.4)
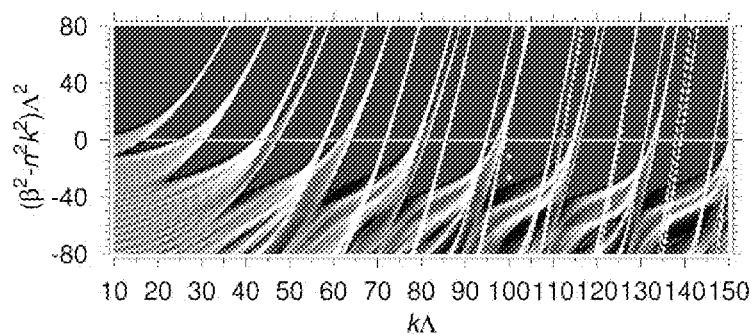
Fig. 4c (d/Λ=0.6)
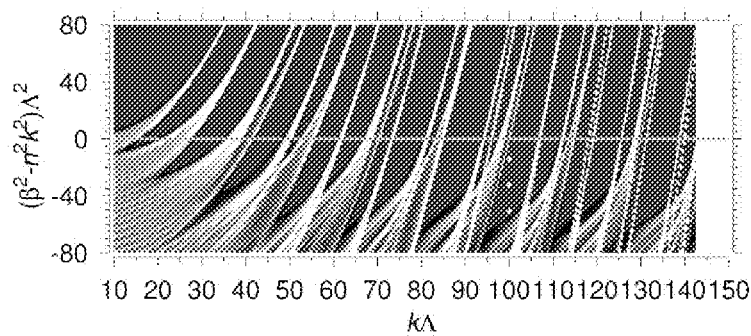
Fig. 4d (d/Λ=0.7)

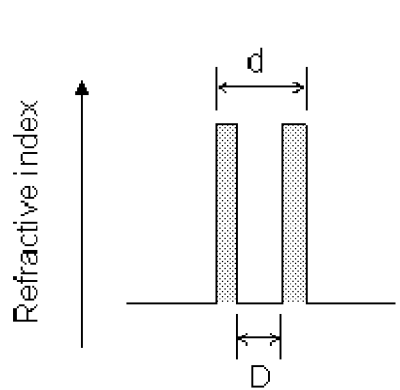
Fig. 5a
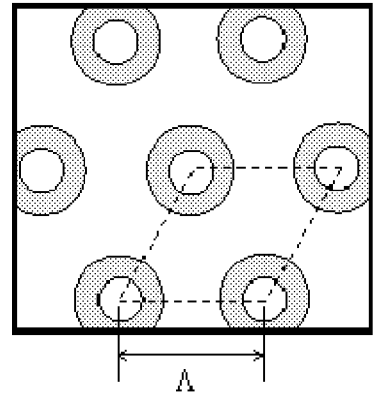
Fig. 5b
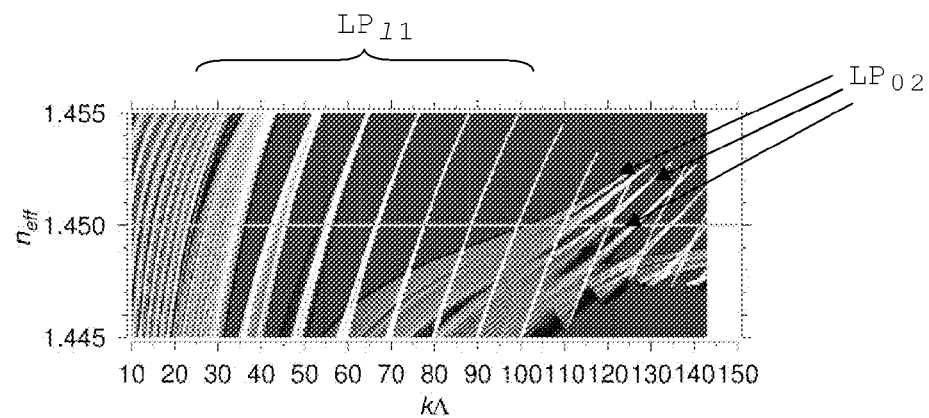
Fig. 6a (D/d=0.7)
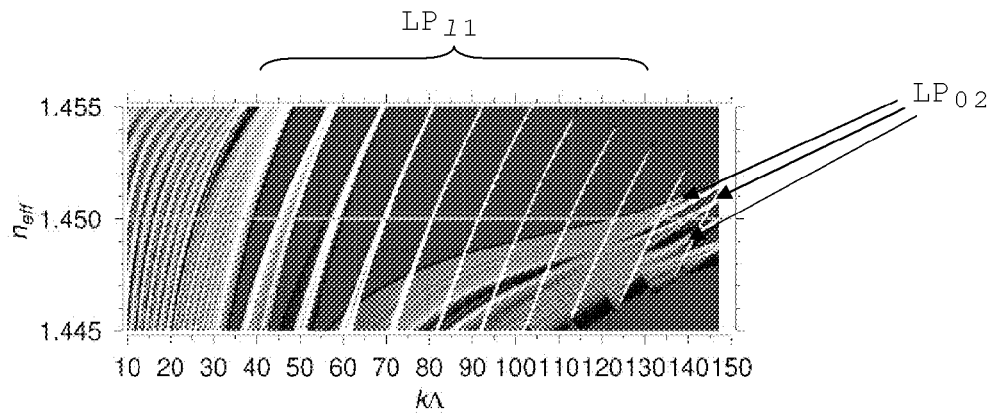
Fig. 6b (D/d=0.75)

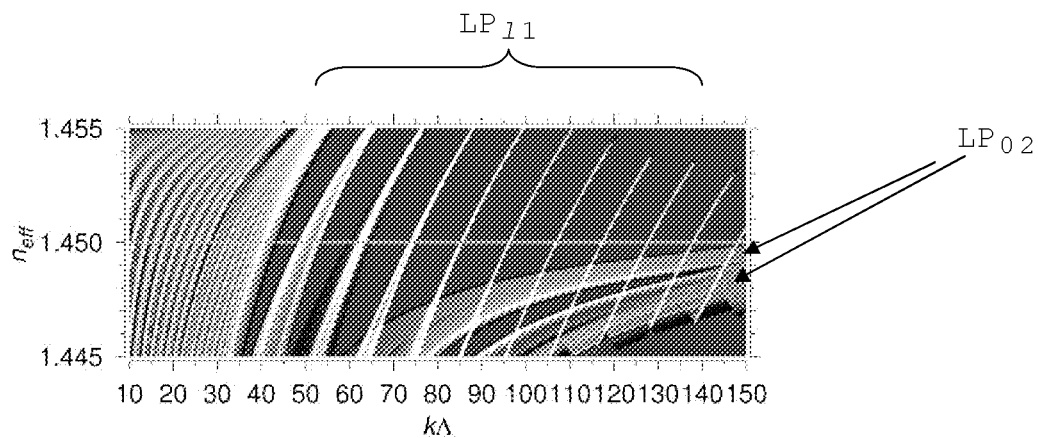
Fig. 6c (D/d=0.8)
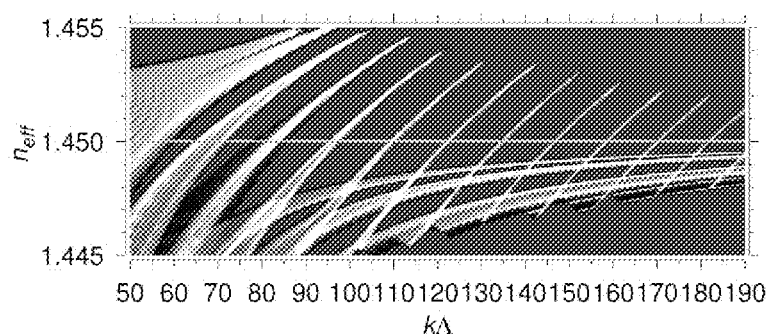
Fig. 6d (D/d=0.9)
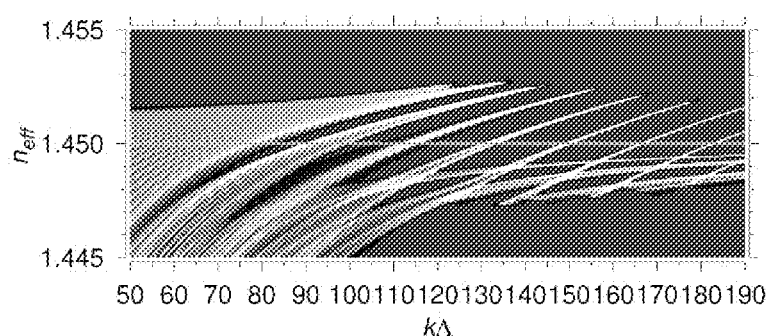
Fig. 6e (D/d=0.95)

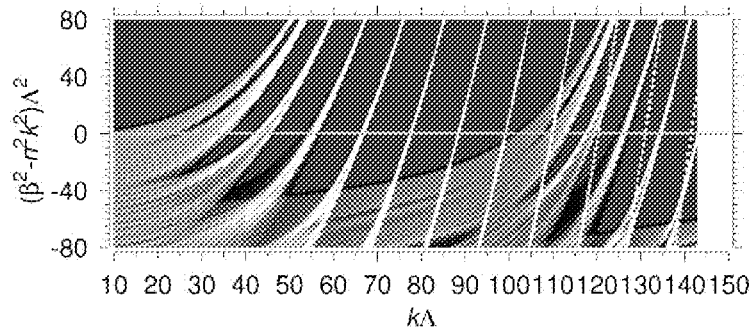
Fig. 7a (D/d=0.7)
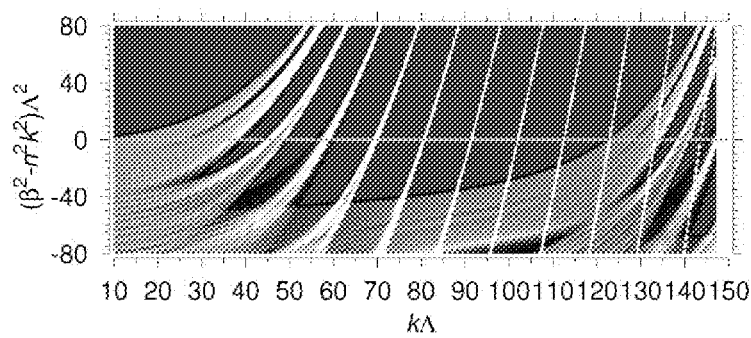
Fig. 7b (D/d=0.75)
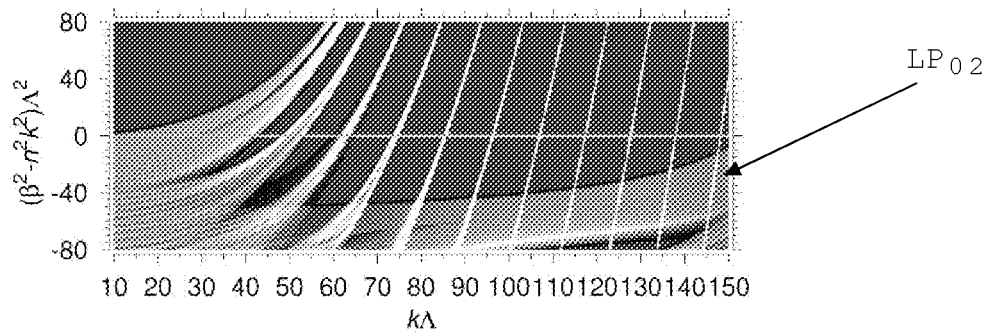
Fig. 7c (D/d=0.8)

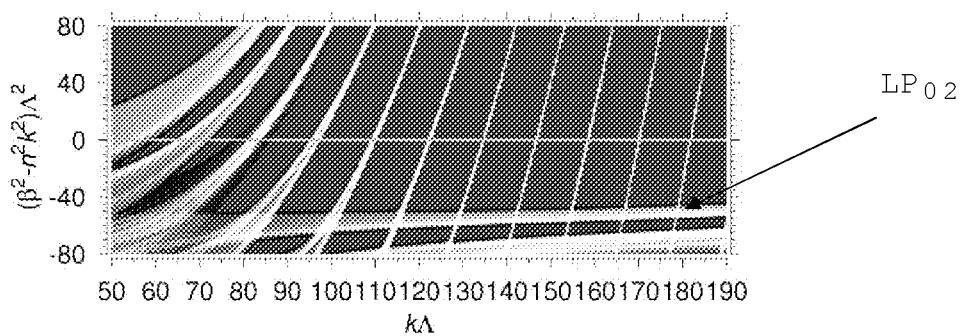
Fig. 7d (D/d=0.9)
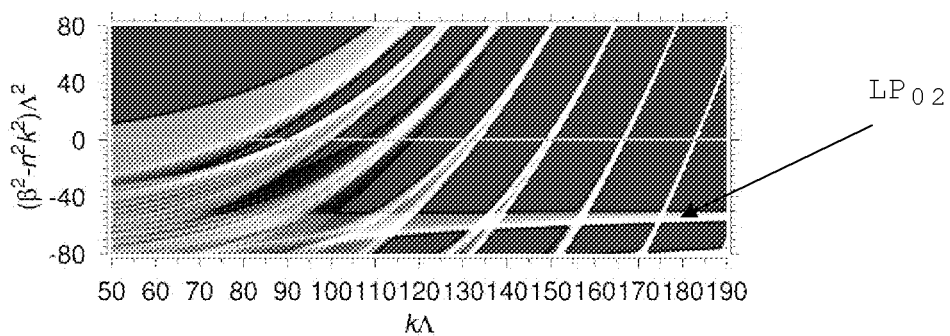
Fig. 7e (D/d=0.95)

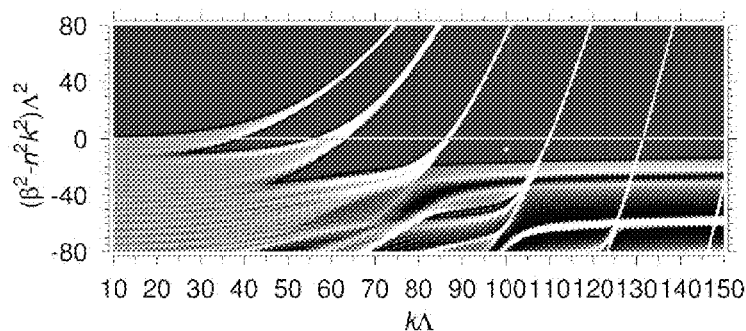
Fig. 8a (d/Λ=0.4)
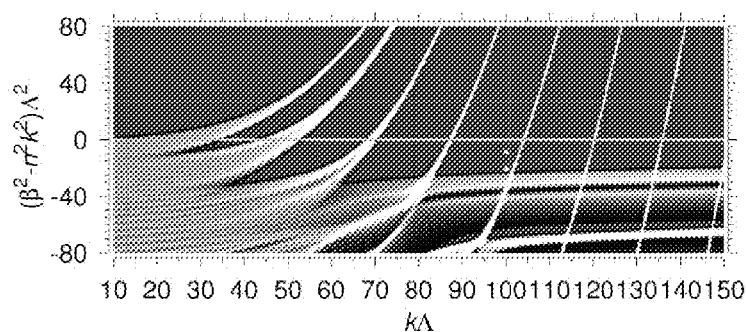
Fig. 8b (d/Λ=0.5)
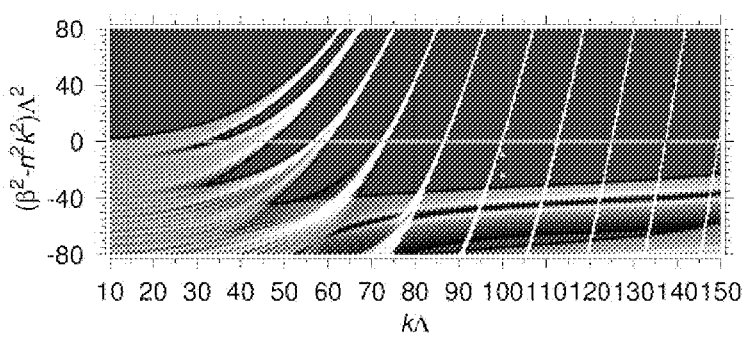
Fig. 8c (d/Λ=0.6)
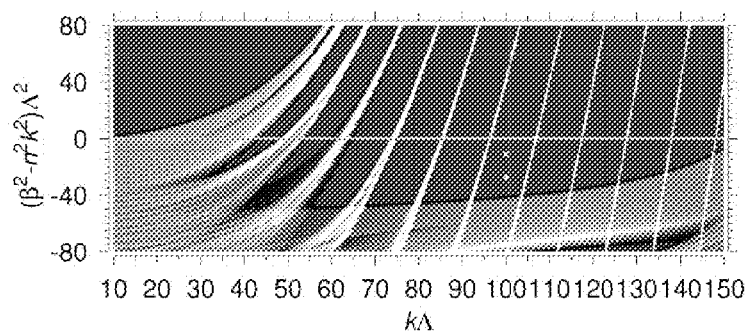
Fig. 8d (d/Λ=0.7)

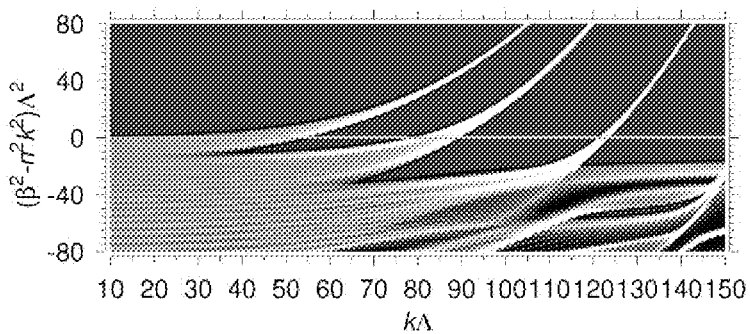
Fig. 9a (Δn=1%)
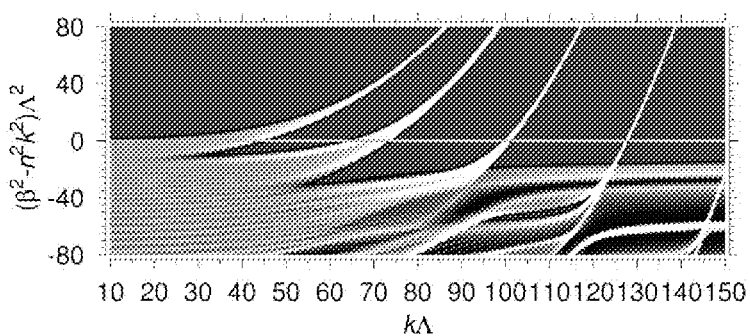
Fig. 9b (Δn=1.5%)
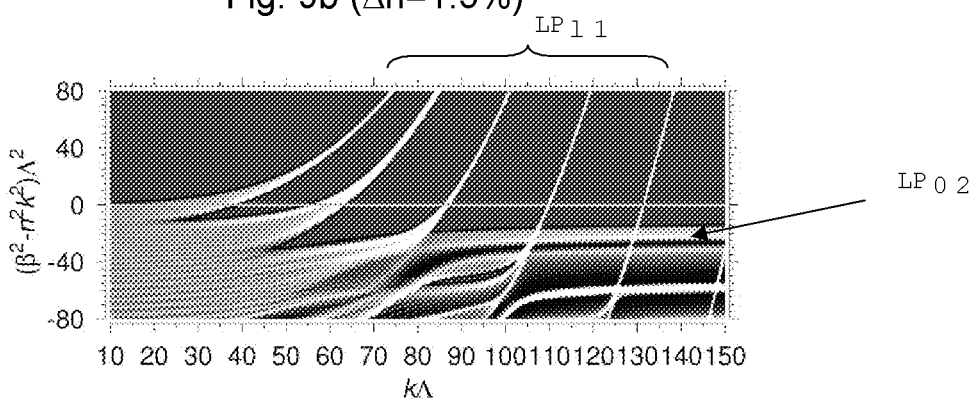
Fig. 9c (Δn=2%)
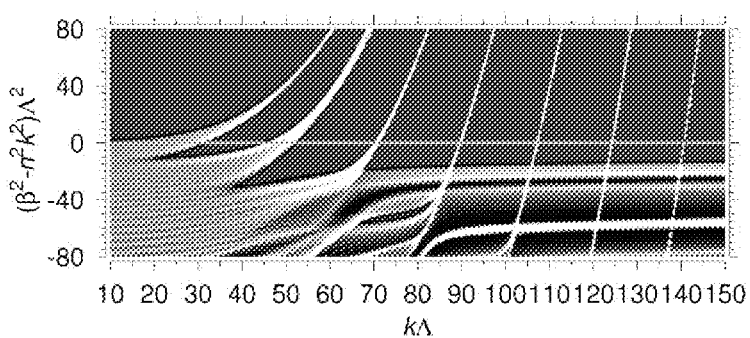
Fig. 9d (Δn=3%)

ALL SOLID PHOTONIC BANDGAP FIBER

RELATED APPLICATIONS

This application is the U.S. National Phase under 35 U.S.C. §371 of International Application No. PCT/JP2009/053788, filed on Feb. 23, 2009, which in turn claims the benefit of Great Britain Application No. 0803864.8, filed on Feb. 29, 2008, the disclosures of which Applications are incorporated by reference herein.

TECHNICAL FIELD

The present invention relates to an optical fiber, and more particularly to an all-solid photonic bandgap optical fiber.

BACKGROUND ART

Optical fibers are used to carry information and energy by the transmission of light. However, when light of a high power is guided by a conventional optical fiber, nonlinear effects, such as Raman and Brillouin scattering, occur in the fiber. These nonlinear effects cause a reduction in the power transmitted, or reduce the quality of the signal used for carrying information in the fiber. To increase the power handling capability, an optical fiber having a guiding region with increased cross-section has been developed. This reduces the optical power density in the fiber thereby reducing non-linear effects. An example of an optical fiber having increased cross-section is a large mode area fiber (LMAF).

High power lasers are used in the field of materials processing. To achieve an output beam of high enough quality for this application, the optical fiber used to transmit the beam is preferably single mode. LMAFs having single mode operation are difficult to attain using conventional refractive index fiber guiding design techniques because as the core diameter increases to provide the large core area, the refractive index difference between the core and the cladding must decrease. For example, for a fiber having a core diameter of 35 µm and a cutoff wavelength of 1.3 µm, the refractive index difference must be about 0.02% for single mode operation. However, it is difficult to obtain such a small refractive index difference in silica based glass using existing doping techniques, such as, adding to the core a material to increase the refractive index, or adding to the cladding a material to decrease the refractive index.

If the fiber cannot be designed to be truly single mode, it is possible to design fibers that provide single mode operation even though they support cladding modes to a small degree. Such fibers may be made by considering the amount of coupling from the core mode to cladding modes and the degree of loss of the cladding mode. If the amount of coupling is small, and the degree of loss is high, then the fiber may work efficiently as a single mode fiber because any transfer of the light intensity to the cladding modes will be rapidly damped thereby preventing degradation of the output beam.

Large mode area photonic crystal fiber (LMAPCF) has been proposed to provide a fiber with a large core to reduce the power density in the fiber and reduce non-linear effects. LMAPCF is made of a single type of glass material and doping is unnecessary. The required refractive index difference between core and cladding is defined by the size of air holes formed in the cladding. Practical LMAPCFs have been developed having a core diameter of 35 µm for use at a wavelength of 1.55 µm, 25 µm for use at 1.06 µm, and 20 µm for use at 0.8 µm. If the core diameter becomes larger than these values, perhaps by decreasing the diameter of the air holes in the cladding, the bend loss of the air-hole type LMAPCF becomes large which is undesirable. A problem with LMAPCFs is that they are difficult to manufacture. For example, it is difficult to accurately control the size of the air holes as the fiber is drawn. Furthermore, LMAPCF has a higher transmission loss compared to optical fibers without air holes.

Alternatively, large mode area fiber can be realized using an all-solid photonic bandgap fiber (PBGF) design. All-solid PBGFs do not have air holes and hence have lower transmission loss. Furthermore, the PBGF can be manufactured using conventional fiber production methods and apparatus.

For example, a conventional all-solid PBGF having a periodic structure consisting of an array of step index rods is shown in FIGS. 2a and 2b. FIG. 2a shows the refractive index profile of a high index rod. The high index rod has a diameter d. FIG. 2b shows the periodic arrangement of the high index rods in the cladding of the all-solid PBGF. In FIG. 2b, a parallelogram (shown as a dashed line) shows a unit cell of the two dimensional periodic structure. The distance from the centre of one high index rod to an adjacent high index rod is Λ. The diameter of the core may be considered to be 2Λ-d, where the core is made by removing single high index rod from the periodic structure.

FIG. 1 shows the relationship between core diameter for an all-solid photonic bandgap fiber, and normalized frequency kΛ of operation. As the core diameter or the ratio d/Λ becomes larger, the normalized frequency kΛ becomes larger (where k represents free space wave number, i.e. 2π/wavelength).

A problem with the resulting conventional PBGF is that it has discrete transmission spectra which restrict the practical wavelength range of operation. Additionally, close to the edges of the transmission band, confinement loss and bend loss are high which further reduce the useable wavelength range. Furthermore, the bend loss is high at even order transmission bands when the parameter d/Λ is around 0.4 (as mentioned above d represents the diameter of a high index region in the periodic structure of the cladding, and Λ represents the pitch of the periodic structure of the cladding). However, for single mode operation in conventional all-solid PBGF in which the high index periodic structure is an array of rods, the parameter d/Λ must be small, so the operational wavelength range of the conventional all-solid PBGF large mode area fiber is small.

FIGS. 3a to 3d are graphs showing a photonic density of states produced by the periodic structure of the cladding. The density of states was calculated using the method described in "Adaptive curvilinear coordinates in a plane-wave solution of Maxwell's equations in photonic crystals", Phys. Rev. B 71, 195108 (2005). In the figures, the abscissa represents normalized frequency kΛ, and the ordinate represents effective refractive index, $n_{\mathit{eff}}$. FIGS. 3a to 3d show the density of states for values of the parameter d/Λ of 0.2, 0.4, 0.6, and 0.7 respectively. In the calculation, the refractive index of the background is 1.45, and the refractive index of the high-index rod is 1.48, thereby providing a refractive index difference of around 2%.

FIGS. 4a to 4d show a calculated density of states for the same values of d/Λ. In these figures, the abscissa again represents normalized frequency kΛ, whereas the ordinate is changed to represent the parameter $(\beta^2 - n^2 k^2)\Lambda^2$ which represents a modal parameter of the electromagnetic field. In particular, $(\beta^2 - n^2 k^2)\Lambda^2$ is an eigenvalue of the scalar wave equation for photonic crystal microstructures. This modal parameter is described in more detail in "Scaling laws and vector effects in bandgap-guiding fibres", Optics Express Vol.

12, 69-74 (2004). Parameters n and β represent the background index of the cladding and longitudinal component of wave vector respectively.

In the graphs of FIGS. 4a to 4d, the plain dark areas represent bandgaps where the density of states is zero. The gray scale areas represent the existence of cladding modes, that is, modes that exist solely or partly in the cladding. The number of cladding modes increases as the grey scale changes from dark to light.

FIGS. 3a to 3d show that at lower values of the normalized frequency kΛ, the bandgaps become deeper (along the ordinate) and narrower (along the abscissa). Qualitatively, the depth of the bandgap (along the ordinate) corresponds to bend loss of the fiber. As the depth becomes shallower (i.e. smaller refractive index difference between allowed modes), the bend loss increases.

As shown in FIGS. 3a to 3d, the bandgaps between cladding modes also become deeper and narrower as the parameter d/Λ becomes larger.

In FIG. 3b, a core guided mode has been superposed on to the cladding modes, and is shown by a thin white line. This core guided mode is calculated for the case in which a single high index rod is removed from the periodic structure. The core guided mode is shown with a normalized frequency from 23 to 60, and bandgap edges at normalized frequencies of 37, 40, and 60.

As mentioned above, FIGS. 4a to 4d show the modal parameter $(\beta^2-n^2k^2)\Lambda^2$ of the cladding modes against normalized frequency kΛ. As the bandgaps become deeper, the difference in the modal parameter between the core guided modes and the cladding modes which form the bottom of the bandgap increases which results in core guided modes with a well confined electromagnetic field in the core region of the fiber. This also results in an increased number of core guided modes. Core guided modes have been calculated for kΛ=100 and are represented by data points in FIGS. 4a to 4d. In FIGS. 4a and 4b, only one core mode lies in the bandgap, and so the optical fiber operates in single-mode. FIGS. 4c and 4d show more than one core mode. In these cases the data point at the largest modal parameter, that is closest to zero, represents the fundamental core guided mode, and the data point at the next largest modal parameter is the first high-order mode. As seen from the figures, when the parameter d/Λ is no greater than 0.4 (FIGS. 4a and 4b), the optical fiber operates in single mode.

From FIGS. 3a to 3d and 4a to 4d it is evident that there is a trade off between bend loss and the maximum core diameter (or smallest wavelength) capable of supporting single mode operation. This is similar to normal index guiding optical fibres, but is exacerbated in PBGF because the trade-off requires even narrower design tolerances. In a PBGF with d/Λ set to about 0.4 to provide single mode operation, a transmission band is largely limited by the bend loss and the bend loss becomes large in even order bandgaps and around the edges in every bandgap. This is caused by the wavelength dependence of the bandgap depth which is inevitable for conventional PBGF.

DISCLOSURE OF INVENTION

The present invention provides a photonic bandgap optical fiber comprising: a core region; and a cladding region surrounding the core region, the cladding region including a background optical material having a first refractive index, and elements comprising high refractive index regions arranged in a two-dimensional periodic structure, wherein each of the elements comprises a centre part and a peripheral part, the peripheral part having a higher refractive index than the centre part; and the elements are arranged such that the normalized modal parameter $(\beta^2-n^2k^2)\Lambda^2$ of the bottom bandgap edge is substantially constant over a normalized frequency range of kΛ, where β is the longitudinal component of wave vector, n is the background index of the cladding, k is the free space wave number, i.e. 2π/wavelength, and Λ is the distance between the centers of the neighboring elements. This fiber provides the advantage that it supports substantially constant number of the core guided modes. Furthermore, the band width of the bandgaps in which the core guided modes exist is wider than of conventional PBGF.

A substantially constant bottom bandgap edge, or lower band edge, means the lower energy edge of the bandgap. This may have a modal parameter $(\beta^2-n^2k^2)\Lambda^2$ which varies by not more than 0.4 over a normalized frequency range kΛ of at least 20, and preferably 30. It is preferable that the frequency range includes the normalized frequency kΛ=100. The bandgap edge can be considered by reference to a plot of normalized modal parameter $(\beta^2-n^2k^2)\Lambda^2$ against normalized frequency kΛ, the bandgap occurring where no modes are supported, such as around the $(\beta^2-n^2k^2)\Lambda^2=0$ value, and the bandgap edge being at a normalized modal parameter $(\beta^2-n^2k^2)\Lambda^2$ below this.

The cross-sectional shape of the centre part may be a circle and the cross-sectional shape of the peripheral part may be a ring or annulus. The ratio of the diameter of the centre part to an outer diameter of the peripheral part may be not less than 0.80.

Alternatively, the cross-sectional shape of the centre part may be a polygon and the cross-sectional shape of the peripheral part may be a hollow polygon. The ratio of the diameter of a circle circumscribing the centre part to a diameter of a circle circumscribing the peripheral part may be not less than 0.80.

The first refractive index may be substantially equal to the refractive index of the centre part. The refractive index difference between the peripheral part and the centre part may be greater than 1%.

In another embodiment there is provided a photonic bandgap optical fiber comprising: a core region; and a cladding region surrounding the core region, the cladding region including a background optical material having a first refractive index, and elements (a high index region) arranged in a two-dimensional periodic structure, and each element comprises a plurality of rods having a second refractive index higher than the first, the rods of each element arranged in a circle or polygon. This embodiment provides the advantage of greater manufacturability than the above embodiments.

The polygon may be a triangle or hexagon. The number of rods in each of the elements may be 3, 6, or 12.

The rods of each element may be arranged to provide a fiber having a core guided mode which is supported over a continuous frequency range and the fiber transmits light substantially as single mode in the range.

The ratio of the diameter of a circle circumscribing the rods to the diameter of the inscribed circle to the rods may be not less than 0.8. The refractive index difference between the rods and the background material may be greater than 1.5%. These values provide a fiber with large bandgaps and higher loss cladding modes.

There is also provided a light transmission apparatus comprising: a photonic bandgap optical fiber; and a first light source arranged to output first incident light having a wave number $kp_1$, wherein the fiber is adapted to transmit the first incident light as the core guided mode and does not transmit a first Stokes light, having a wave number $ks_1$ and induced from the first incident light in said fiber, by coupling the first Stokes light to the cladding mode and attenuating it therein.

The wave number, ke, of the low frequency side bandgap edge of the bandgap comprising the wave number $kp_1$ may meet the relationship $kp_1 > ke > ks_1$, and the difference between the transmittances of the first incident light and the first Stokes light may be not less than 15 dB.

BRIEF DESCRIPTION OF DRAWINGS

FIGS. 3a to 3d are graphs showing a calculated density of states (DOS) of the all-solid PBGF of FIGS. 2a and 2b, wherein the abscissa represents normalized frequency $k\Lambda$, the ordinate represents effective refractive index $n_{eff}$, and a parameter $d/\Lambda$ is 0.2, 0.4, 0.6, or 0.7, respectively.

FIGS. 4a to 4d are graphs showing a calculated DOS of the all-solid PBGF of FIGS. 2a and 2b, wherein the abscissa represents normalized frequency $k\Lambda$ and the ordinate represents the modal parameter $(\beta^2 - n^2k^2)\Lambda^2$.

FIGS. 5a and 5b are conceptual diagrams showing a refractive index profile of a high-index region and periodic structure, respectively, in an all-solid PBGF of first embodiment.

FIGS. 6a to 6e are graphs showing a calculated DOS of an all-solid PBGF of the first embodiment, wherein the abscissa represents normalized frequency $k\Lambda$, the ordinate represents effective refractive index $n_{eff}$, and a ratio D/d of inner diameter to outer diameter of a ring is 0.7, 0.75, 0.8, 0.9, or 0.95, respectively.

FIGS. 7a to 7e are graphs showing a calculated DOS of the all-solid PBGF of the first embodiment, wherein the abscissa represents normalized frequency $k\Lambda$, and the ordinate represents the modal parameter $(\beta^2 - n^2k^2)\Lambda^2$.

FIGS. 8a to 8d are graphs showing a calculated DOS of an all-solid PBGF of the first embodiment, wherein the abscissa represents normalized frequency $k\Lambda$, the ordinate represents the modal parameter $(\beta^2 - n^2k^2)\Lambda^2$, and a parameter $d/\Lambda$ is 0.4, 0.5, 0.6, or 0.7, respectively.

FIGS. 9a to 9d are graphs showing a calculated DOS of the all-solid PBGF of the first embodiment, wherein the abscissa represents normalized frequency $k\Lambda$, the ordinate represents the modal parameter $(\beta^2 - n^2k^2)\Lambda^2$, and the refractive index difference $\Delta n$ is 1%, 1.5%, 2%, or 3%, respectively.

FIG. 10b is a graph showing a calculated DOS of the all-solid PBGF according to FIG. 10a.

FIG. 11b is a graph showing a calculated DOS of the all-solid PBGF according to FIG. 11a.

FIG. 12b is a graph showing a calculated DOS of the all-solid PBGF according to FIG. 12a.

FIG. 13b is a graph showing a calculated DOS of the all-solid PBGF according to FIG. 13a.

FIG. 14b is a graph showing a calculated DOS of the all-solid PBGF according to FIG. 14a.

Figure 1:
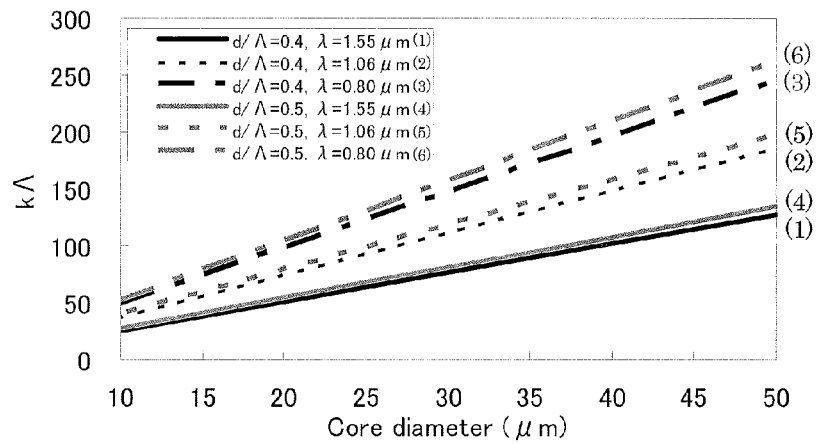
FIG. 1 is a graph showing the relation between core diameter and normalized frequency $k\Lambda$ in an all-solid photonic bandgap fiber (PBGF) using parameters $d/\Lambda$ and wavelength.
Figure 2A:
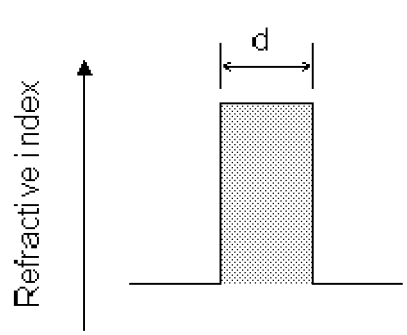
FIGS. 2a and 2b are conceptual diagrams showing a refractive index profile of a high-index region and a periodic structure in the cladding of an all-solid PBGF.
Figure 2B:
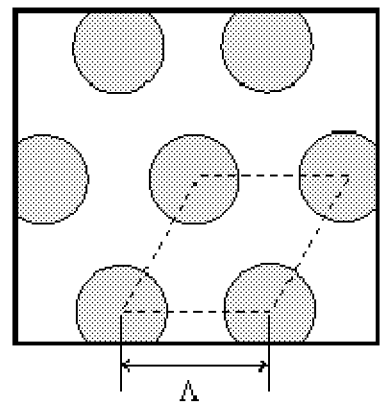

In all of FIGS. 10b, 11b, 12b, 13b, and 14b the abscissa represents normalized frequency $k\Lambda$, and the ordinate represents the modal parameter $(\beta^2 - n^2k^2)\Lambda^2$.

BEST MODE FOR CARRYING OUT THE INVENTION

FIGS. 5a and 5b show an improved structure for a PBGF. The periodic structure is comprised of ring type high index regions instead of rod type high index regions. The ring type structures are described using an additional structural parameter, D, which specifies the internal diameter of the ring. Alternatively, we may specify the ring type structure by the ratio of inner to outer diameter, D/d. In the present example, the refractive index of the background is 1.45 and the refractive index of the high index regions is 1.48, which similarly to the example of a PBGF comprised of rods described regarding the prior art, provides a refractive index difference of around 2%. The outer diameter, d, of the ring is $0.70\Lambda$.

The inventors have realized that by careful adjustment of the above parameters, the transmission properties of the PBGF can be optimized. In particular, if the parameters are adjusted to provide a fiber having a modal parameter $(\beta^2 - n^2k^2)\Lambda^2$ which is substantially constant over a range, then a low loss, large area, single mode optical fiber can be achieved.

FIGS. 6a to 6e show the relationship between bandgap structure and ring thickness. In particular, these figures show the density of states (DOS) in the cladding relative to normalized frequency, $k\Lambda$ (as represented on the abscissa), and effective refractive index, $n_{eff}$ (as represented on the ordinate). The FIGS. 6a to 6e illustrate the DOS for the following ratios of ring inner diameter to outer diameter (D/d) respectively: 0.7, 0.75, 0.8, 0.9, and 0.95. In FIGS. 6d and 6e the maximum value shown on the abscissa is increased to $k\Lambda=190$ from the value of $k\Lambda=150$ used in FIGS. 6a to 6c. As the parameter D/d increases, each of the cladding modes shift to higher normalized frequency. The $LP_{l1}$ modes (l=0, 1, 2, 3 etc) shift less than any of the other $LP_{lm}$ modes where $m \neq 1$. As indicated in the figures, $LP_{02}$ modes exist in the lower portion of the graph at $k\Lambda$ of around 100.

FIGS. 7a to 7e are graphs showing the calculated density of states of FIGS. 6a to 6e but shown with the modal parameter $(\beta^2 - n^2k^2)\Lambda^2$ on the ordinate. It is significant that the $LP_{02}$ cladding mode which forms the bottom of the bandgaps is approximately parallel to the abscissa in FIGS. 7d and 7e (D/d=0.90 and 0.95 respectively). In FIG. 7c (D/d=0.80) the cladding mode $LP_{02}$ is parallel to the abscissa in the normalized frequency range of around 60 to 100. In addition, in these regions the $LP_{l1}$ modes (l=2,3 . . . ) become narrower and approach perpendicular to the abscissa as the normalized frequency becomes large. Therefore, the depth to the top of the $LP_{02}$ mode (i.e. bandgap width in the ordinate direction) becomes the dominant factor in determining the number of core guided modes. Hence, because the $LP_{02}$ mode is approximately parallel to the abscissa, the bandgap depth is independent of the normalized frequency. This means that the number of core guided modes is largely independent of normalized frequency.

It is difficult to realize such a bandgap shape in the conventional all-solid PBGF. For example, as shown in FIG. 4, the bottom shape of the each bandgap has a gradient at around the normalized frequency $k\Lambda=100$. For example, in the case of FIG. 4b (d/Λ=0.4), the gradient (the rate of change in the modal parameter $(\beta^2-n^2k^2)\Lambda^2$ per unit kΛ) is about 0.4. The equivalent graph for the ring type PBGF is shown in FIG. 8a, which shows that this gradient has a value of about 0.1 for d/Λ=0.4. Considering practical use of the PBGF for high power laser delivery, it is useful if single mode operation is realized over the wavelength range of a wavelength variable laser light source such as a Ti-sapphire laser. Furthermore, it will be also useful if more than two major laser wavelengths such as 1.06 μm and 1.55 μm, or 0.80 μm and 1.06 μm are covered. In such cases, it is preferable that the gradient is kept small (i.e. less than 0.4) over the normalized frequency (kΛ) range of 20, more preferably 30, and which includes the point of kΛ=100.

Turning to FIGS. 8a to 8d in more detail, these show how the band gap varies with the parameter d/Λ, (rather than D/d, as shown in FIG. 7) and show a calculated density of states (DOS) for the structure described above and in FIGS. 5a and 5b. FIGS. 8a to 8d show the DOS varies with respect to the modal parameter $(\beta^2-n^2k^2)\Lambda^2$ (on the ordinate) and normalized frequency kΛ (on the abscissa) for the following values of d/Λ: 0.4, 0.5, 0.6 and 0.7 respectively. In these figure the ratio D/d is fixed to 0.8. FIGS. 8a to 8d show that as the parameter d/Λ increases (i.e. the structure of the fiber is changed such that the high index rings are moved closer to the core of the fiber), the bandgap depth becomes deeper. The data points at kΛ=100 represent core guided modes. These show that the border between a core having single mode and multimode operation lies between d/Λ of 0.4 and 0.5.

FIGS. 9a to 9d show the relationship between density of states (DOS) and refractive index for the above example. Again, the abscissa shows normalized frequency, kΛ, and the ordinate shows modal parameter $(\beta^2-n^2k^2)\Lambda^2$. FIGS. 9a to 9d represent different values of refractive index difference, Δn, namely, 1%, 1.5%, 2%, and 3%. In these figures the ratio D/d and d/Λ are fixed at 0.9 and 0.7 respectively. As the refractive index difference becomes larger, the bandwidth of the $LP_{l1}$ modes gets narrower and they begin to approach parallel to the ordinate. Hence, by changing the refractive index difference, the area in which the bandgap exists can be controlled over a wide normalized frequency.

The above description and FIGS. 6a to 6e, 7a to 7e, 8a to 8d, and 9a to 9d, show that by carefully selecting the ratios D/d and d/Λ for a ring type all-solid PBGF the wavelength dependency of the bandgap depth and the usable normalized frequency range can be optimized to produce a practical LMAF. Furthermore, because the bandwidth of the cladding mode is narrow, and the modal parameter is approximately constant over a wide wavelength range, a number of core guided modes can be maintained over a wide wavelength band. Since the bandgap depth can be controlled independently, it is easy to design a single-mode operation in a wide wavelength range using this design.

Although we have mentioned above that single mode operation is only achieved for d/Λ of 0.4 or less (see FIG. 8a) in calculation, in practice effective single mode operation occurs for values of d/Λ slightly greater than 0.4. This is because higher order modes have higher loss than the fundamental mode due to the difference in bend loss or confinement loss. So even though higher order modes exist in the calculations they are much more lossy than the fundamental mode which means the fiber can be considered to effectively operate in single mode only. For example, some air-hole type PCFs demonstrate single mode operation with d/Λ of 0.50. Hence, when considering the range of d/Λ for which single mode operation is achieved, the bend loss of the higher order modes that is actually achieved in practical use should be taken in to account. In all-solid PBGF, confinement loss is larger and higher order modes are more easily decayed than air-hole type PCF. Hence, for all-solid PBGF effective single mode operation is also possible for d/Λ up to 0.50. Furthermore, single mode operation is expected for d/Λ over 0.50, for example 0.60, due to the high confinement loss.

In addition, in the optical fiber according to the present invention, the cladding modes at the bandgap edges are predominantly $LP_{l1}$ modes which are strongly confined to the high index rods. Hence, the bandwidth of the cladding modes is narrower and the bandgap depth around the edges of the bands is deeper than for the rod-type all-solid PBGF. Therefore, for the ring type PBGF, the width of the loss band is narrower and the bend loss near the bandgap edge is smaller than for the rod-type PBGF.

Furthermore, as shown in FIGS. 9a to 9d the wavelengths of the $LP_{l1}$ cladding modes can be controlled while the depths of the bandgaps are maintained by controlling refractive index. As the refractive index difference is increased, the normalized frequencies of the $LP_{l1}$ cladding modes become smaller. In addition, if the refractive index difference is large, the width of the $LP_{l1}$ cladding modes becomes extremely narrow and the loss caused by the bandgap edges is reduced still further.

In other embodiments, the high index region is not restricted to a circular ring. For example, provided that the high index region allows the realization of a bandgap region in which the depth of the bandgap with respect to the modal parameter $(\beta^2-n^2k^2)\Lambda^2$ is largely independent of the normalized frequency over a wide frequency range, a single mode large mode area fiber can be realized. In particular, we have found that this can be achieved by having a high index region that includes, at least, a centre part having a refractive index smaller than the remainder of the high index region.

Figure 10A:
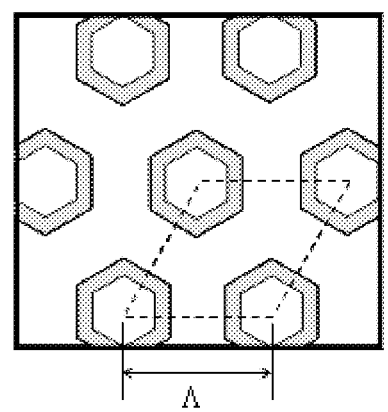
FIG. 10a is a conceptual diagram showing a periodic structure having high-index regions of hollow hexagonal shape.
Figure 10B:
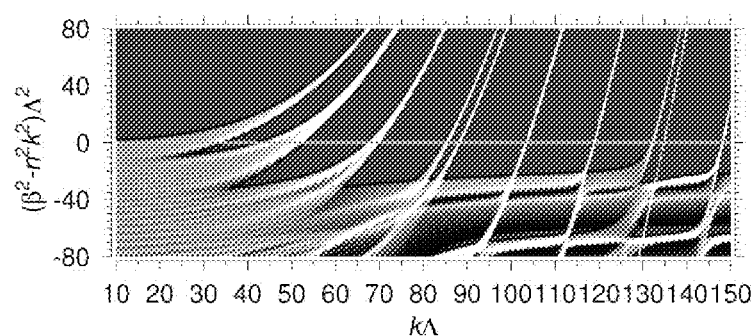

In one embodiment, the high index region has a hollow polygon as the peripheral part. FIG. 10a shows a periodic structure having a hollow hexagon as the high index region. FIG. 10b is a graph showing a calculated density of states (DOS) wherein the abscissa represents normalized frequency kΛ, and the ordinate represents modal parameter $(\beta^2-n^2k^2)\Lambda^2$. The bandgap structure of the hollow polygon type optical fiber is similar to the ring type all-solid PBGF fiber shown in FIG. 9. In the case of a ring-type fiber, the high index region will approach that of a hollow polygon type fiber but with rounded vertices due to glass flow filling the interspaces between the stacked rods during manufacture. In such a case, the band gap structure of the fiber is similar to the ring type optical fiber, and depth and gradient of the bandgap can be controlled by the size and thickness of the hollow polygon.

Figure 11A:
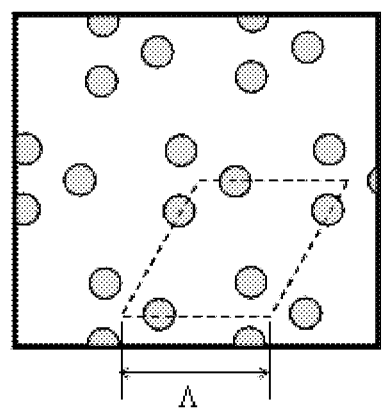
FIG. 11a is a conceptual diagram showing a periodic structure having high-index regions comprised of three rods of circular cross-section arranged at the vertices of an equilateral triangle.
Figure 11B:
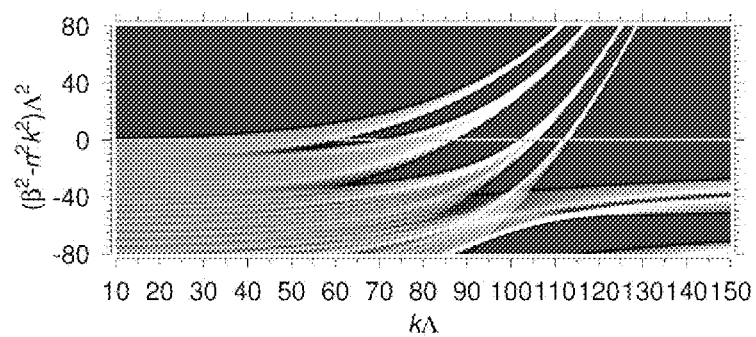
Figure 12A:
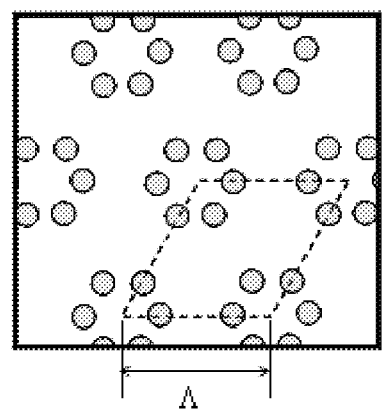
FIG. 12a is a conceptual diagram showing a periodic structure having high-index regions comprised of six rods of circular cross-section arranged at the vertices of a hexagon.
Figure 12B:
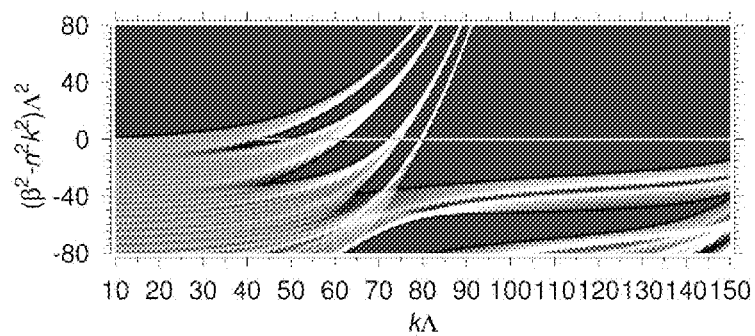
Figure 13A:
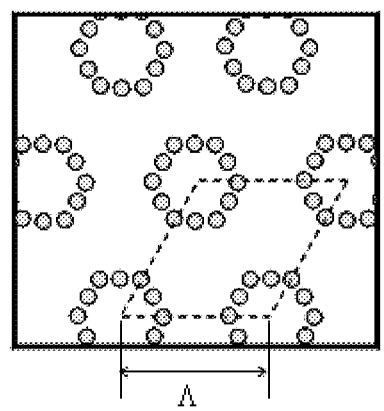
FIG. 13a is a conceptual diagram showing a periodic structure having high-index regions comprised of twelve rods of circular cross-section arranged on the vertices and sides of a hexagon.
Figure 13B:
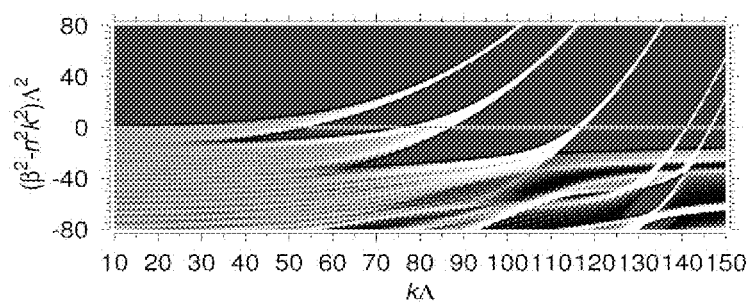
Figure 14A:
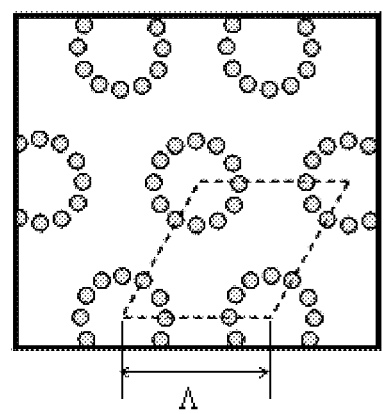
FIG. 14a is a conceptual diagram showing a periodic structure having high-index regions having twelve rods of circular cross-section arranged on a circle.
Figure 14B:
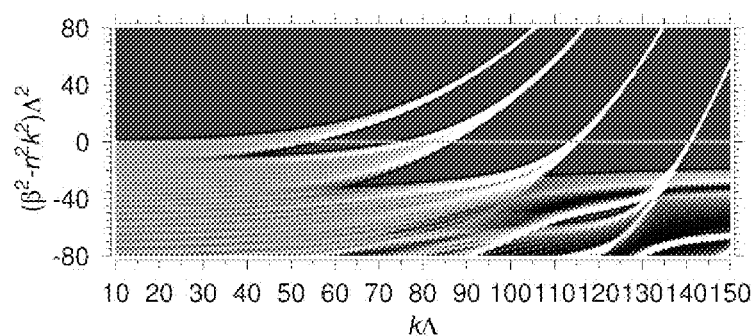

In another embodiment, rods having circular cross-section are arranged in a circular or a regular polygonal pattern to form the peripheral part of the high index region as shown in FIGS. 11a, 12a, 13a, and 14a. FIG. 11a shows three such rods arranged at the vertices of an equilateral triangle. FIG. 12a shows six such rods arranged at the vertices of a hexagon. FIG. 13a shows twelve such rods arranged on the vertices and the sides of a hexagon. FIG. 14a shows twelve such rods arranged in a circle. FIGS. 11b, 12b, 13b, and 14b are graphs showing the density of states (DOS) of the all-solid PBGF according to FIGS. 11a, 12a, 13a, and 14a respectively. As in some of the previous figures, the abscissa represents normalized frequency kΛ, and the ordinate represents modal parameter $(\beta^2-n^2k^2)\Lambda^2$. In each of these cases, the depth and gradient of the bandgap can be controlled by changing either outer diameter of the circular rod, or the size of the circle or regular polygon along which the rods are arranged. Especially, the structures shown in FIGS. 11b and 12b provide improved performance over the ring-type PBGF, as these structures do not permit the bandgap edge in the transmission band at high frequency region. Therefore, these structures have the advantage of offering a broad and continuous transmission band.

In FIGS. 10a to 14a, the circular rods forming the high refractive index regions are all oriented in the same way. For example, in FIG. 11a, the rods are arranged on the vertices of an equilateral triangle, and for each triangle one vertex points to the right, and the two other vertices are arranged such that one is vertically above the other in the figure. This orientation is the same for each triangle. However, in embodiments where the number of rods in each polygon is six or more, if the orientation from one polygon to another is different, this will cause only very small changes to the DOS. Thus, a small change in the orientation of the polygons during manufacture will not affect, or will only have a very small affect, on the density of states of the resulting PBGF.

In the embodiments comprising an array of rods of circular cross-section arranged around a circle or polygon, some of the structure parameters determined for the ring type structure are also of use here. For example, a ratio D/d (ratio of diameter of circle or polygon to the diameter of the rods) of greater than 0.8 is preferred, and a refractive index difference between the rods and the background material of at least 1.5% is also preferable.

Method of Manufacture

The ring-type PBGF can be made by the stack and draw method or drilling method.

In the stack and draw method, a rod which is to be an individual high index region can be made by the multiple stacking process, the modified chemical vapor deposition method (MCVD), or the outside vapor phase deposition method (OVD) to provide a rod with, for example, a high index outer region. The rod (for the periodic cladding regions) is elongated and divided into a plurality of canes. These canes are stacked around one cane of lower refractive index, which is to be the core. Next, these stacked canes are inserted into a jacket pipe to produce the fiber preform having a central core and a cladding having a periodic structure. The fiber can be made from the preform either by collapsing the preform and then drawing the fiber, or by directly drawing at the same time as it is collapsed in a drawing furnace.

In the drilling method, the rod is made by the same methods, such as by the multiple stacking process, MCVD, or OVD. To form the preform, the rod is elongated, divided, and inserted into a hole drilled in a glass body which will form the background material. The outer surface region of the rod may be made from silica glass containing $GeO_2$ so as to have a higher refractive index than the background material. Alternatively, the outer surface region of the rod may consist of glass of background material. The former type of rod is preferably made by the OVD method, whereas the latter type of rod may preferably be made by the multiple stacking process or MCVD process.

In embodiments where the shape of the peripheral part of the high index region is not a ring but is of another geometry, the high index regions can be made by the same methods.

For the embodiments described in FIGS. 11a and 12a, the high index rods which form the circular rods can be directly inserted to holes drilled in the glass body which forms the background material. For the cases, where the number of high index rods is small, the orientation of the polygons can be easily achieved. When the number of rods forming the polygon is greater than six (such as in FIGS. 13a and 14a), it is preferable not to have to insert individual rods into drilled holes from the production point of view. Since in these cases the precise orientation of the polygon does not affect bandgap structure, the high index region can be made by the stack and draw method.

The material for the optical fibers according to the present invention may be pure silica, or silica doped with germanium, phosphorus, or aluminum. These three dopants act to increase refractive index of the silica, and may be used as dopants in the high index regions. Alternatively, we may use silica doped with fluorine or boron which act to decrease the refractive index of the silica. These dopants may be used in the core and background material. A co-doping of the above mentioned elements may also be used. By using silica glass, conventional optical fiber manufacturing methods and apparatus may be used while allowing a low transmission loss fiber to be produced having high reliability.

Optical fibers according to the present invention may be manufactured using conventional techniques thereby providing a high quality product at low cost. Furthermore, since the fiber does not include air holes, the structure of the fiber can be more easily controlled during production.

Application of PBGF According to the Present Invention

One application of a PBGF according to the present invention is to prevent stimulated Raman scattering (SRS) which can adversely affect high power transmission. SRS is a non-linear optical effect which occurs when high power light is present in an optical fiber. The SRS causes some of the optical power to shift to different wavelengths, referred to as the Stokes light. In some cases most of the light input into the fiber is moved to the Stokes light. Shift of some of the optical power to the Stokes wavelength reduces the power transmitted at the desired wavelength, which is undesirable for power transmission. However, if the fiber can be made to have high loss at wavelengths at which the Stokes light occurs, the effect of the SRS can be suppressed. The transmission band of an all-solid PBGF is not continuous such as for an air-hole type LMAPCF and is interrupted by cladding modes. At the wavelength where the transmission band is interrupted, the core guided modes are not present and the light around the centre core couples to the cladding mode and decays rapidly. If there is not a core guided mode at the Stokes wavelength, the loss outweighs Raman gain. Thus, the shift to the Stokes light can be reduced. For example, in silica glass, the first Stokes light occurs at about 13.2 THz lower frequency than the transmission frequency. At a wavelength of 1.55 µm, the Stokes wavelength is approximately 0.1 µm longer wavelength than 1.55 µm. Hence, SRS can be suppressed when high power 1.55 µm light is input to the fiber if the fiber has a large loss around 1.66 µm.

As described above, the cladding modes usually have high loss and the light coupled to the cladding modes decay rapidly. However, if the cladding mode is well confined in the high index rods with low confinement loss and material loss, there might be the case that the light coupling to the cladding modes by SRS in the core does not decay rapidly. Even if that is the case, SRS suppression can be realized by making the high index rods with lossy materials. Therefore, in another embodiment of the invention, it is preferable that the material loss of the high index rods is high enough to prevent the Stokes lights in the cladding mode from being gained by Raman effect. Such fiber can be fabricated by co-doping of high loss materials into the high index rods. The high loss materials are, for example, transition metals or rare earth metals. Of course, they are not limited to the above-mentioned examples, any materials which attenuate the cladding modes can be used for the purpose of this embodiment.

A PBGF according to the present invention can be designed to suppress SRS at multiple wavelengths. For example, in a silica based optical fiber, the first Stokes light induced by SRS at transmission wavelengths of 1.06 and 1.55 µm are 1.11 and 1.66 µm respectively (i.e. approximately 0.05 and 0.11 µm longer than each of the transmission wavelengths). Therefore, if both the transmission wavelengths are in the transmission band, and the Stokes wavelengths are in high loss bands, the optical power shifted to the first Stokes wavelengths can be suppressed. If the difference in transmission of light at a desired wavelength (e.g. 1.55 µm, 1.06 µm, or 0.80 µm) and the wavelength of a first Stokes light is not less than 15 dB, then good suppression of SRS can be achieved.

A further advantage of the ring type PBGF, and other embodiments (such as non circular ring and polygon high index part PBGFs) described herein over the conventional rod-type all-solid PBGF is that in the ring-type fibers the cladding modes consist of $LP_{l1}$ modes, and as seen from the density of states graphs, if the cladding mode at the band edge consists of such modes, isolation between the transmission band and the high loss band is large. This means that light at the Stokes frequencies can be sharply filtered. The wavelength variation of the high loss band may occur when the fiber is bent. However, the variation in the high loss band is much smaller for the PBGFs of the present invention than for the conventional rod-type all-sold PBGFS. Therefore, PBGFs of the present invention, such as the ring-type fiber, are less affected by bending which is advantageous for the optical power delivery use.

In addition, the fibers of the present invention are all-solid and do not contain air holes which improves maintenance of the fiber end face. If the optical fiber has air holes, dust may accumulate in the air holes and when high power light is input, the end surface may become damaged and introduce excess losses.

The person skilled in the art will readily appreciate that the above described invention may be changed in many ways without departing from the scope of the appended claims. For example, the high index regions may be arranged on polygons having different numbers of sides, or the glass or doping materials used may be changed.

The invention claimed is:

1. A photonic bandgap optical fiber comprising:
a core region; and
a cladding region surrounding the core region, the cladding region including a background optical material having a first refractive index n, and elements arranged in a two-dimensional periodic structure, wherein:
each of the elements comprises a centre part and a peripheral part, the peripheral part having a higher refractive index than the centre part,
the elements are arranged such that the fiber has a band gap in a normalized modal parameter $(\beta^2-n^2k^2)\Lambda^2$ of the fiber, with a lower band edge of the band gap substantially constant over a range of normalized frequency $k\Lambda$, where $\beta$ is a longitudinal component of wave vector, k is a free space wave number, and $\Lambda$ is a distance from a center of one element to a center of an adjacent element in the cladding region, and
the first refractive index is substantially equal to the refractive index of the centre part.

2. The optical fiber according to claim 1, wherein the normalized modal parameter $(\beta^2-n^2k^2)\Lambda^2$ does not vary by more than 0.4 over a range of normalized frequency $k\Lambda$ of at least 20.

3. The optical fiber according to claim 1, wherein the range of normalized frequency includes the point $k\Lambda=100$.

4. The optical fiber according to claim 1, wherein a cross-sectional shape of the centre part is a circular disc and a cross-sectional shape of the peripheral part is a ring.

5. The optical fiber according to claim 4, wherein a ratio of a diameter of the centre part to an outer diameter of the peripheral part is not less than 0.80.

6. The optical fiber according claim 1, wherein a cross-sectional shape of the centre part is a polygon and a cross-sectional shape of the peripheral part is a hollow polygon.

7. The optical fiber according to claim 6, wherein a ratio of a diameter of a circle circumscribing the centre part to a diameter of a circle circumscribing the peripheral part is not less than 0.80.

8. The optical fiber according to claim 1, wherein a refractive index difference between the peripheral part and the centre part is greater than 1%.

9. The optical fiber according to claim 1, wherein a ratio $d/\Lambda$ is less than 0.6, where d is an outer diameter of the elements.

10. A light transmission apparatus comprising:
the photonic bandgap optical fiber according to claim 1; and
a first light source arranged to output first incident light having a wave number $kp_1$,
wherein the fiber is adapted to transmit the first incident light as a core guided mode and does not transmit a first Stokes light, having a wave number $ks_1$ and induced from the first incident light in the fiber, by coupling the first Stokes light to a cladding mode and attenuating it therein.

11. The light transmission apparatus according to claim 10, wherein a wave number, ke, of a low frequency side bandgap edge of the bandgap comprising the wave number $kp_1$ has a relationship $kp_1>ke>ks_1$, and a difference between transmittances of the first incident light and the first Stokes light is not less than 15 dB.

12. The light transmission apparatus according to claim 11, further comprising:
a second light source arranged to output second incident light having a wave number $kp_2$, wherein the fiber transmits the second incident light as a core guided mode and does not transmit a second Stokes light, having a wave number $ks_2$ and induced from the second incident light in the fiber, by coupling the second Stokes light to the cladding mode and attenuating it therein.

13. A method of suppressing stimulated Raman scattered light in an optical transmission system, the method comprising steps of:
supplying light from a light source; and
coupling the light into photonic bandgap optical fiber, the optical fiber comprising:
a core region; and
a cladding region surrounding the core region, the cladding region including a background optical material having a first refractive index n, and elements arranged in a two-dimensional periodic structure, wherein:
each of the elements comprises a centre part and a peripheral part, the peripheral part having a higher refractive index than the centre part,
the elements are arranged such that the fiber has a band gap in a normalized modal parameter $(\beta^2-n^2k^2)\Lambda^2$ of the fiber, with a lower band edge of the band gap substantially constant over a range of normalized frequency $k\Lambda$, where $\beta$ is a longitudinal component of wave vector, k is a free space wave number, and Λ is a distance from a center of one element to a center of an adjacent element in the cladding region, the first refractive index is substantially equal to the refractive index of the centre part, and stimulated Raman scattered light is attenuated by the cladding region of the optical fiber.

* * * * *

UNITED STATES PATENT AND TRADEMARK OFFICE
CERTIFICATE OF CORRECTION

PATENT NO.        : 8,503,846 B2
APPLICATION NO. : 12/920037
DATED             : August 6, 2013
INVENTOR(S)       : Taru et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 407 days.

Signed and Sealed this

Fifteenth Day of September, 2015

Michelle K. Lee
*Director of the United States Patent and Trademark Office*